United States Patent [19]

Baxter

[11] 4,301,441
[45] Nov. 17, 1981

[54] ALARM AND ANTITHEFT SYSTEM FOR AN AUTOMOTIVE VEHICLE

[76] Inventor: Benjamin Baxter, P.O. Box 215, Fowler, Calif. 93625

[21] Appl. No.: 169,992

[22] Filed: Jul. 18, 1980

[51] Int. Cl.³ .................... B60R 25/04; B60R 25/10
[52] U.S. Cl. .............................. 340/64; 307/10 AT
[58] Field of Search ............... 340/63, 64; 307/10 AT

[56] References Cited

U.S. PATENT DOCUMENTS

3,525,414  8/1970  Copelan .............................. 340/64
3,569,931  9/1968  Baxter ................................. 340/64

Primary Examiner—Alvin H. Waring
Attorney, Agent, or Firm—Huebner & Worrel

[57] ABSTRACT

An alarm and antitheft system for an automotive vehicle having a master relay, which defines a running condition and an alarm condition which is assumed when the ignition switch of the vehicle is in the off position, and a cut-out relay, the master relay including an element selectively lockable to maintain the relay in one or the other of these conditions or unlockable for manual actuation of the master relay into the running condition and including contacts which, in the alarm condition, electrically bypass the horn switch of the vehicle to warn of attempted unauthorized operation, open the ignition circuit of the vehicle, and connect the lighting circuit of the vehicle to a device to signal that the lights are on, and the cut-out relay being energized from the horn in the alarm condition to open the starting circuit of the vehicle.

10 Claims, 4 Drawing Figures

ALARM AND ANTITHEFT SYSTEM FOR AN AUTOMOTIVE VEHICLE

BACKGROUND OF THE INVENTION

1. Field of the Invention

The present invention relates to an alarm and antitheft system for an automotive vehicle, and more particularly to such a system connected with conventional automotive electrical circuits to provide an alarm and to disable the ignition and starting systems of the vehicle when unauthorized use of the vehicle is attempted, to provide a signal when lights of the vehicle are left on with the ignition system de-energized, and to select these functions or conventional operation of the vehicle by either key locked or momentary actuation of a suitable element.

2. Description of the Prior Art

Vehicles have been provided with antitheft systems and with alarm systems having elaborate functions, mechanisms, and circuitry. However, as is well known, the majority of thefts of automotive vehicles occur when the ignition key is inadvertently left in an unoccupied vehicle. A system to frustrate unauthorized use of a vehicle under these circumstances would, therefore, prevent the majority of automotive vehicle thefts without unnecessary expense or inconvenience due to features which are rarely of benefit and are, therefore, likely to be inadvertently or intentionally disabled by the owner of a vehicle.

Automotive alarm systems and antitheft systems which include switching devices connected to conventional ignition and horn circuits of a vehicle are well known. A system including such a device, hereinafter referred to as the "earlier system," is disclosed in U.S. Pat. No. 3,569,931 issued to the applicant on Mar. 9, 1971. A copy of this patent is enclosed in connection with the "Prior Art Statement."

The subject invention includes several improvements in the earlier system to provide greater flexibility in operation, to provide a system which is simpler and more economical to install on an existing vehicle and to include in a vehicle when initially manufactured, and to accommodate and advantageously to utilize features of automotive vehicles that have become prevalent since application was made for patent of the earlier system.

The earlier system included a manually actuatable element to transfer the system between an alarm condition and a running condition. This element was either a push-button or was key lockable. However, the use of a system having such an element is facilitated by such an element having both push-button and key-lockable modes of operation.

The earlier system provided a switching device which electrically interrupted the connection between a distributor and a coil of an existing vehicle ignition system to that "hot wiring" to the coil did not permit unauthorized operation of the vehicle. When the previous system was conceived, automotive vehicles were infrequently equipped with hood latches and with stransmissions which did not allow starting the engine of a vehicle by moving the vehicle. However, presently manufactured automotive vehicles are provided with lockable hoods which impede hot wiring and, typically, are provided with an automatic transmission which does not allow starting the engine other than by the usual electric starting system. It is, therefore, advantageous to provide an antitheft system which disables the starting system of an automotive vehicle to prevent its unauthorized use.

An improved system having these advantages is especially advantageous if its arrangement is simple and if the length of wiring required is relatively short. It is particularly desirable to limit the number of penetrations of electrical conductors through the firewall of a vehicle and to take advantage of the proximity in a vehicle of elements of an alarm and antitheft system to conventional lighting and alarm elements to provide a signal that the vehicle lights are inadvertently illuminated and, in general, to provide simplified and economical wiring arrangements.

PRIOR ART STATEMENT

Characterizing the closest prior art of which the applicant is aware, and in compliance with 37 C.F.R. S1.97 and S1.98, attention is invited to the following patent issued to the applicant, a copy of which is submitted with this application.

U.S. Pat. No. 3,569,931, Mar. 9, 1971.

This patent is believed relevant in its disclosure of an automotive vehicle antitheft system having a switching device connected to an automotive ignition system for disconnecting the ignition system and electrically energizing an alarm, the device having an element which is manually actuated to permit normal operation of the vehicle.

This patent does not disclose such a system which interrupts the starting system of a vehicle to prevent theft of the vehicle, which includes an auxiliary relay energized from the alarm to interrupt the starting circuit, or which utilizes such a switching device to signal that the lights of a vehicle are on when its ignition switch is off. This patent also does not disclose a device having an element which, selectively, is key lockable to bypass the alarm and antitheft functions of such a system, lockable to prevent operation of the vehicle, or unlockable for push-button actuation with the key remote from the device.

SUMMARY OF THE INVENTION

It is an object of the present invention to provide an improved alarm system for an automotive vehicle.

Another object is to provide such a system which frustrates unauthorized operation of the vehicle by disabling its electrical starting system.

Another object is to provide such a system which energizes a warning device when unauthorized operation of an automotive vehicle is attempted and which utilizes a relay energized from the warning device to disable the starting system.

Another object is to provide such a system which is simply and economically arranged to provide a signal that the lights of the vehicle are energized when the ignition switch of the vehicle is in an off position.

Another object is to provide such a system having an element which is key lockable in an alarm condition to prevent operation of the vehicle and to energize the warning device if unauthorized operation is attempted and which provides the flexibility of actuating the element with the key removed to transfer the system to a running condition from the alarm condition.

Another object is to provide such a system which is both easily installed on an existing vehicle and economically included in a vehicle as originally manufactured.

Further objects and advantages are to provide improved elements and arrangements thereof in an alarm system for an automotive vehicle which is dependable and fully effective in performing its intended purposes.

DESCRIPTION OF THE PREFERRED EMBODIMENT

Figure 1:
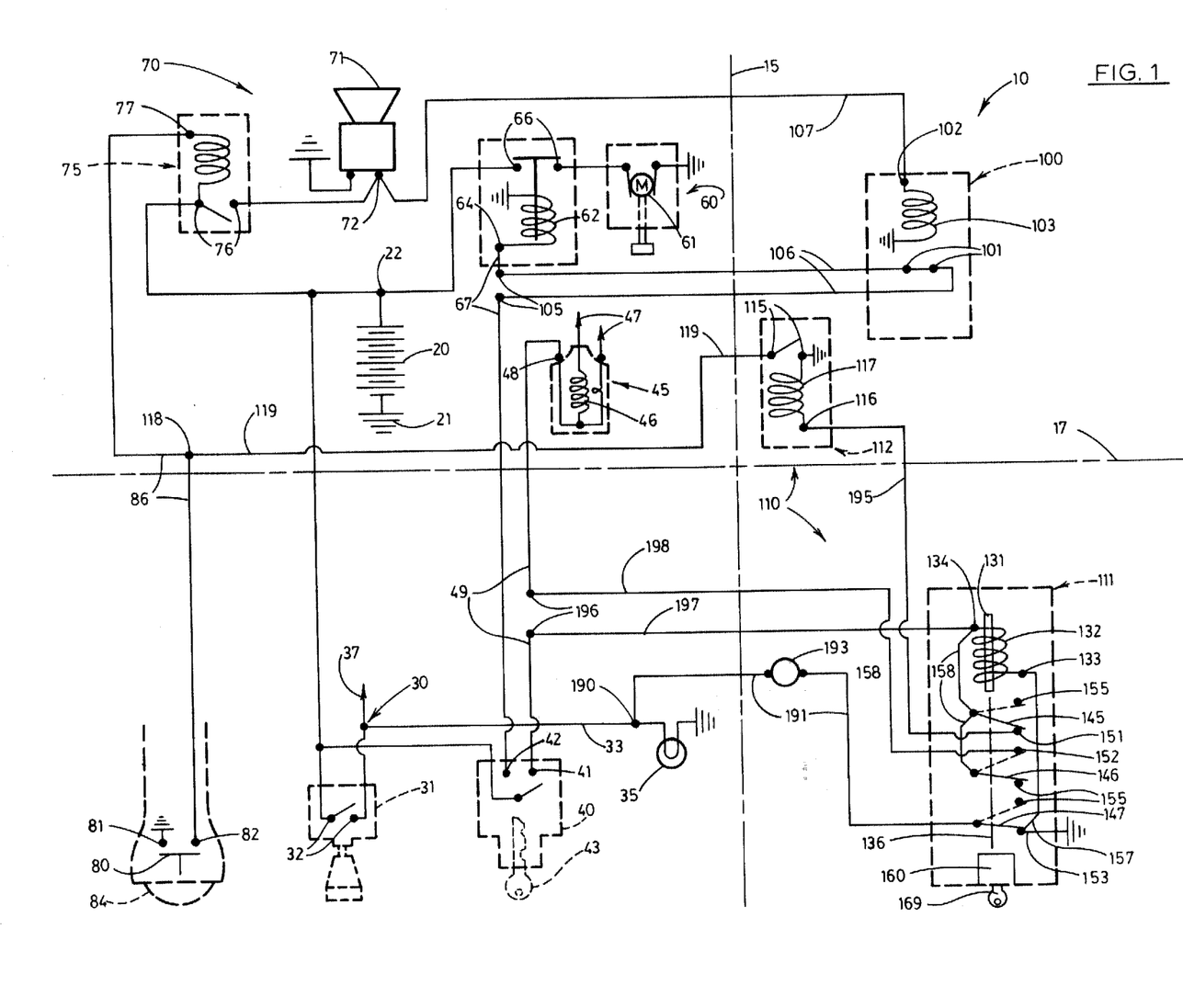
FIG. 1 is an electrical circuit diagram of an alarm and antitheft system embodying the principles of the present invention together with related elements of an automotive vehicle equipped with the system.

Referring with greater particularity to the drawings, an alarm and antitheft system 10 for an automotive vehicle is schematically depicted in FIG. 1. The system embodies the principles of the present invention and is connected with conventional elements of the vehicle. In general, these conventional elements are depicted to the left of the line 15, while the elements of the system of the present invention are depicted to the right of this line. Those elements of the system and of a vehicle which are disposed in an engine compartment are depicted above the line 17 while those disposed in a passenger compartment are depicted below this line, this line thus represents the firewall of the vehicle.

The vehicle is equipped with a battery 20 providing electrical energy between a ground terminal 21 and a live terminal 22.

The vehicle is further equipped with a lighting system, indicated generally by the numeral 30 which includes a lighting switch 31 providing opposite terminals 32. One of these terminals is connected by a lighting conductor 33 to a light 35 so that the light is energized from the battery 20 when the switch is closed. This conductor is electrically connected to the headlights of the car as indicated by the arrowhead 37. Preferably, this light is an instrument light which is disposed within the passenger compartment of the car and is energized whenever the headlights of the car are energized.

The vehicle is equipped with a key-actuated ignition switch 40 having an ignition terminal 41 and a starting terminal 42. This switch, typically, is actuated by a key 43 and is locked against actuation when the key is removed from the switch. The ignition switch is electrically connected to the live terminal 22 and serves selectively to energize either one or neither of its terminals from the battery 20.

The vehicle is equipped with an ignition system 45 which includes a coil 46 and other elements, not shown, connected to the coil, as indicated by the arrowheads 47. The coil has a terminal 48 connected to the battery 20 to energize the ignition system. The vehicle is equipped with an ignition conductor 49 connecting the terminal of the coil with the ignition terminal. The vehicle is equipped with a starting system 60 having a motor 61, a solenoid 62, and a terminal 64 connected to the solenoid. When this terminal is electrically connected to the live terminal 22, the solenoid is energized and, in turn, energizes the motor by electrically connecting the battery 20 to the motor through contacts 66.

The vehicle is equipped with a starting conductor 67 electrically connecting the starting terminal 42 with the terminal 64.

The vehicle is equipped with a warning system indicated generally by the numeral 70. This system has a warning device or horn 71 having a terminal 72 which, when energized from the battery 20, emits a warning which is effective exteriorly of the vehicle. The warning system includes a horn relay 75 having a pair of normally open contacts 76 and a terminal 77 which, when electrically connected to the ground terminal 21, results in the contacts being closed. These contacts are electrically connected between the live terminal and the terminal of the horn. The warning system has a normally open, momentary contact, warning switch 80 having a terminal 81 electrically connected to the ground terminal 21 and an opposite terminal 82 which is selectively connected to the ground terminal by actuation of a horn button 84. The opposite terminal is connected by a conductor 86 to the horn relay terminal. As a result, pressing the button closes the warning switch and grounds the relay terminal so that the relay contacts close and energize the horn terminal.

The alarm and antitheft system 10 has first switching elements included in a cut-out relay 100 of well-known construction. This relay has a pair of normally closed contacts 101, a control terminal 102, and a solenoid 103 connected between the control terminal and the ground terminal 21. The solenoid is adapted to open the contacts electromagnetically when the control terminal is energized. The alarm system is provided with a pair of connections 105 disposed oppositely of a break in the starting conductor 67. A pair of conductors 106 individually interconnect these connections with the normally closed contacts so that these contacts are connected in series in the starting conductor. A conductor 107 interconnects the control terminal and the terminal 72 of the horn 71. The solenoid is thus connected between the horn terminal and the ground terminal so that the cut-out relay opens electrical connection between the starting terminal 42 and starting solenoid 62 when the control terminal is energized from the horn terminal and closes this electrical connection when the control terminal is de-energized.

The system 10 has second switching elements 110 included in a master relay 111 and an auxiliary relay 112. The auxiliary relay is of well-known construction and has a pair of normally open contacts 115, one of which is electrically connected to the ground terminal 21; a control terminal 116; and a solenoid 117, which is connected between this control terminal and the ground terminal and is adapted to close the contacts electromagnetically when the control terminal is energized. The system is provided with a connection 118 on the conductor 86 and with a conductor 119 which electrically interconnects this connection to the other of the normally open contacts. These contacts are thus connected in parallel with the warning switch 80 and, when closed, bypass this switch and cause the horn 71 to be energized although the button 84 is not pressed.

Figure 2:
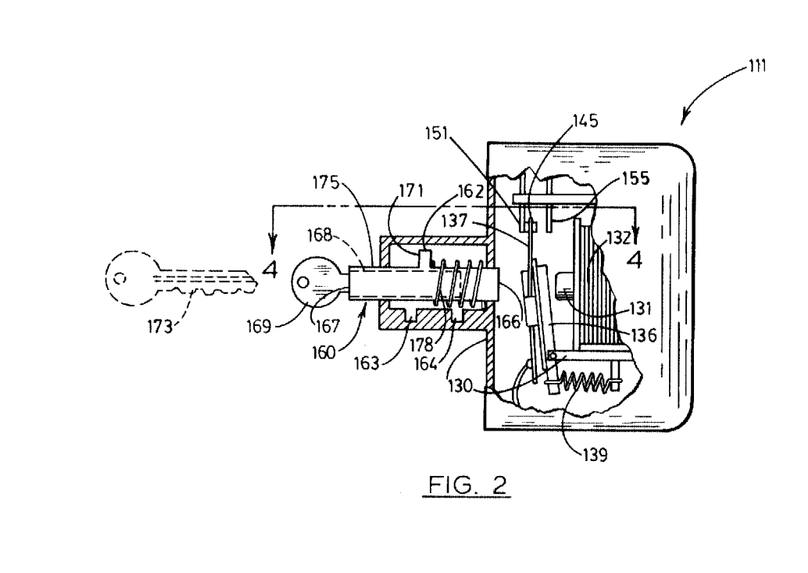
FIG. 2 is a schematic elevation of a master relay used in the system of FIG. 1 with portions broken away to show interior elements in an alarm condition.

The master relay 111 is depicted in all of the figures and has a frame 130 fixedly mounted in a position accessible by the operator of a vehicle provided with the alarm and antitheft system 10. The relay has a cylindrical core 131 fixedly mounted on the frame and wound with a solenoid 132 having a ground terminal 133 and an opposite input terminal 134. The relay includes an armature 136 pivotally mounted on the frame at one end of the core for movement between an alarm position 137, spaced from the core as shown in FIG. 2, and a running position 138, shown in FIG. 3, wherein the armature it engaged with one end of the core and juxtaposed to the solenoid. When the input terminal is electrically connected to the live terminal 22, the solenoid is energized and electromagnetically urges the armature toward the running condition. As is well known, the electromagnetic force exerted on such an armature so disposed in relation to a core is substantially greater when the armature is engaged with the core than when the armature is spaced therefrom. The relay has a first spring 139 which resiliently urges the armature toward the alarm position. The spring is dimensioned and proportioned so that its resilient force is sufficient to overcome the electromagnetic force in the alarm position, but insufficient to overcome the electromagnetic force in the running position. As a result, when the solenoid is energized, the armature is stable in either one of its positions and remains therein in the absence of other forces. However, when the solenoid is de-energized so that no electromagnetic force is exerted, the armature assumes the alarm position under the urging of the spring in the absence of other forces.

Figure 4:
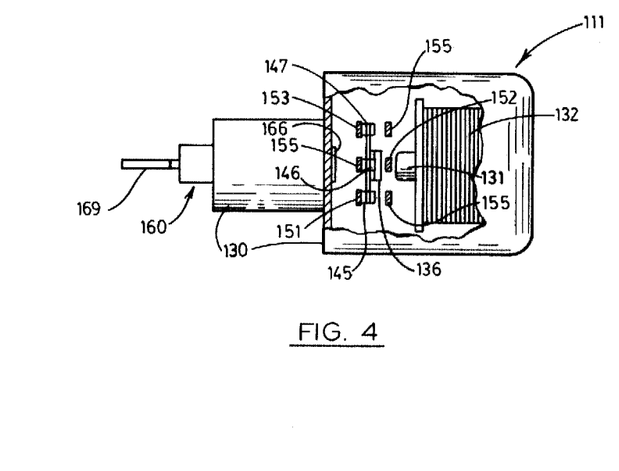
FIG. 4 is a sectional view of the relay taken on line 4—4 of FIG. 2.

The master relay 111 is of triple-pole, double-throw construction having a movable alarm contact 145, a movable running contact 146, and a movable lighting contact 147. These contacts are mounted on the armature 136 and are electrically insulated from it and from each other. The movable contacts are motivated by the armature to move with it between its alarm position 137 and its running position 138. In FIG. 1, the movable contacts are depicted in the alarm position in solid lines and in the running position in dashed lines. The relay has a fixed alarm contact 151, a fixed running contact 152, and a fixed lighting terminal or contact 153 mounted on the frame and electrically insulated from it and from each other. In relation to the armature, as best shown in FIG. 4, the fixed alarm contact and the fixed lighting contact are disposed in a direction away from the core 131 so as to be engaged, respectively, by the movable alarm contact and the movable lighting contact when the armature is in its alarm position. However, the fixed running contact is disposed toward the core from the movable running contact so as to engage this contact when the armature is in its running position. The pair of alarm contacts and the pair of lighting contacts are thus closed in the alarm position and opened by movement toward the running position while the pair of running contacts are open by movement toward the alarm position and closed in the running position.

The master relay 111 includes three unused fixed contacts 155 disposed individually oppositely of the movable contacts 145, 146, and 147 from the corresponding fixed contacts 151, 152, and 153. As shown in FIG. 1, the master relay includes a ground conductor 157 which electrically connects the ground terminal 21 of the battery 20 with the ground terminal 133 and with the fixed lighting contact 153. This contact is thus connected to the ground terminal of the battery when the armature is in the alarm position and is disconnected from this terminal in the running position. The master relay includes a conductor 158 which electrically connects the movable alarm contact 145, the movable running contact 146, and the input terminal 134.

Figure 3:
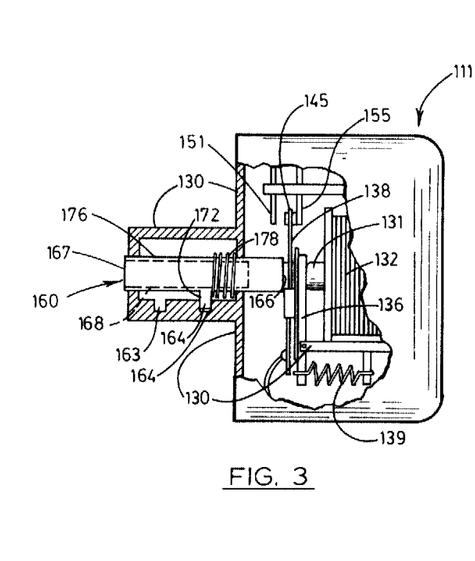
FIG. 3 is an elevation similar to FIG. 2 with the elements of the relay in a running condition.

As best shown in FIGS. 2 and 3, the master relay 111 has a manually actuatable, generally cylindrical element 160 slidably and rotationally mounted in the frame 130 oppositely of the armature 136 from the core 131 in substantially coaxial relation thereto. This element has an axially central, radially extended latch 162 adapted to engage a first notch 163 and a second notch 164 disposed in the frame at one side of the element and spaced axially of the element a distance substantially equal to the movement therealong of the armature between its alarm position 137 and its running position 138. The element has an axial end 166 disposed toward the core and adapted to engage the armature. The opposite end 167 of the element is disposed outwardly of the frame and is manually accessible. The element is provided with a key-lock mechanism 168 of well-known construction having a detachable master key 169. When the key is inserted in the mechanism, the element is rotatable to move the latch between an unlocked position 171, shown in FIG. 2, wherein the latch extends away from the notches, and a locked position 172, wherein the latch engages one of the notches and prevents axial movement of the element. The key is detachable from the mechanism in either of these positions as depicted in dash lines 173 in FIG. 1. In the unlocked position, the element is axially slidable between a first position 175 and a second axial position 176, corresponding, respectively, to the alarm position and to the running position of the armature. In the first position, the latch is engageable with the first notch and in the second position, the latch is engageable with the second notch. The master relay includes a second spring 178 which is concentric with the element and resiliently urges the element toward its first position. The end 167 of the element and, when inserted therein, the key are selectively actuatable by the operator to move the element from the first position against the urging of this spring into the second position.

When the element 160 is in its first position 175, it is slightly disengaged from the armature 136 so that the armature is free to assume its alarm position 137 when the input terminal 134 is not energized. When the element is in its second position 176, the armature is engaged by the end 166 and forced to assume the running position 138 against the urging of the first spring 139. If the solenoid 132 is energized when the armature is already in the running position, the armature is retained therein electromagnetically whether the element is in the second position or not. If the armature is in its alarm position and the element is in its unlocked position 171, manually motivated movement of the element into the second position against the second spring 178 carries the armature into the running position. If the element is then rotated into its locked position 172, the element is locked in engagement with the armature which is held thereby in the running position whether the solenoid is energized or de-energized. If the element is subsequently rotated into its unlocked position and is not manually motivated toward the second position when the solenoid is de-energized, the first spring urges the armature toward the alarm position. The armature then engages the end 166 of the element and the first spring, together with the second spring, urge the element in a direction toward its first position. The key-lock mechanism thus selectively provides three operating conditions for the master relay. In one condition, the element is locked in its second position to retain the armature in the running position. In another condition, the element is locked in its first position so that the element cannot be manually actuated to move the armature into the running position. In the third condition, the element is unlocked for slidable movement between its first and second positions. With the key in a position remote from the master relay, as suggested by FIG. 3, the relay cannot be changed from a previously selected one of these three conditions.

The alarm and antitheft system 10 is provided with a connection 190 to the lighting conductor 33 and with a light signaling conductor 191 electrically interconnected between this connection and the movable lighting contact 147. This signaling conductor and the ground conductor 157 are thus a pair of conductors individually connecting the lighting contacts 147 and 153 to the ground terminal 21 of the battery and to the lighting conductor. The alarm and antitheft system has an electrically energizable signaling device 193 connected in series in the signaling conductor. The device, typically, is a buzzer disposed within the passenger compartment of a vehicle provided with the system. The signaling device is, therefore, connected so as to be energized through the signaling conductor when the lighting switch is closed and the armature 136 is in its alarm position 137.

The system 10 has a conductor 195 interconnecting the control terminal 116 of the auxiliary relay 112 with the fixed alarm contact 151. This control terminal is, therefore, energized through this contact and the movable alarm contact 145 when the armature 136 is in the alarm position 137 and when the input terminal 134 is energized from the ignition terminal 41. The terminal 72 of the horn 71 is thereby energized, energizing the solenoid 103 and preventing energization of the starting system 60 from the starting terminal 42. It is thus apparent that the alarm contacts electrically connect the terminal of the auxiliary relay to the input terminal in the alarm condition and, conversely, electrically disconnect the auxiliary relay from the ignition terminal in the running position.

The system 10 is provided with a pair of connections 196 disposed oppositely of a break in the ignition conductor 49 so that one of these connections is electrically connected to the ignition system 45 and the other is electrically connected to the ignition terminal 41. The system has a conductor 197 interconnecting the one of these connections connected to the ignition terminal with the input terminal 134 which is, the turn, connected by the conductor 158 to the movable running contact 146. The system has a conductor 198 interconnecting the other of these connections with the fixed running contact 152 thereby connecting this contact to the ignition system 45. The running contacts, which are included in the master relay 111 of the associated switching elements 110, are thus connected in series between the ignition terminal and the ignition system and connect the ignition terminal to the ignition system in the running position 138 of the armature 136 and disconnect the ignition terminal from the ignition system in the alarm position 137.

OPERATION

The operation of the described embodiment of the present invention is believed to be clearly apparent and is briefly summarized at this point. The alarm and antitheft system 10 has an alarm condition defined by the armature 136 being in its alarm position 137 and a running condition defined by the armature being in its running position 138.

In the running condition, the lighting contacts 147 and 153 are open so that the signaling device 193 cannot be energized. In this condition, the alarm contacts 145 and 151 are also open so that the solenoid 117 of the auxiliary relay 112 cannot be energized to bypass the warning switch 80 and energize the horn 71 and the solenoid 103 of the cut-out relay 100. As a result, the horn is only energized when the button 84 is pressed and the starting system 60 will be energized when the ignition switch 40 is actuated to energize its starting terminal 42. In the running condition, the running contacts 146 and 152 are closed so that the ignition system 45 is energized whenever the ignition switch is actuated to energize its ignition terminal 41.

When the alarm and antitheft system 10 is in its running condition, the vehicle operates conventionally, as if it were not provided with the system. Therefore, when the element 160 is locked into the second notch 164 with the key-lock mechanism 168, this system is rendered inoperative, adapting the vehicle for authorized operation by those, such as parking facility attendants, who are unfamiliar with the system. In the running condition, when the horn 71 is energized in the usual manner by pushing the button 84, the solenoid 103 of the cut-out relay 100 is energized through the conductor 107 so that the contacts 101 are opened and the starting system 60 cannot be utilized. However, this does not cause inconvenience in operation of a vehicle provided with the system, since it would be highly unusual to wish to sound the horn simultaneously with use of the starting system.

In the alarm condition, the running contacts 146 and 152 are open so that the ignition system 45 cannot be energized from the ignition terminal 41. As a result, the vehicle cannot be operated in the absence of "hot wiring" to bypass these contacts. However, in the alarm condition, de-energization of the ignition terminal results in the opening of the contacts 101, as previously described, opening electrical connection between the battery 20 and the solenoid 103 so that the motor 61 is not energized when the starting terminal 42 is energized. The starting system 60 is thus rendered inoperative even if the vehicle is hot wired. Energization of the ignition terminal in the alarm condition also energizes the horn 71, giving warning exteriorly of the vehicle that unauthorized operation of the vehicle is being attempted. As a result, when the key 43 is inadvertently left in the ignition switch 40, an unauthorized attempt to operate the vehicle in the usual manner results in such warning being given while the vehicle cannot be started since its ignition system 45 and its starting system 60 are disabled. Although such an unauthorized attempt energizes the solenoid 132 of the master relay 111, the system remains in the alarm condition since, as previously described, the electromagnetic force cannot overcome the resilient force of the first spring 139.

The system 10 is locked in its alarm condition by locking the element 160 into the first notch 163 and removing the key 169 from the mechanism 168. It should be noted that if such locking occurs when the ignition terminal 41 is energized, its subsequent de-energization, as by locking the ignition switch 40, results in the armature 136 being moved into its alarm position 137 by the spring 139. The system thus assumes the alarm condition since this condition is assumed whenever the ignition terminal is de-energized and the element 160 is in its first position 175. The alarm condition is assumed whether the element is locked in the first notch or is in the first position 175 while also being in the unlocked position 171.

While the system 10 can be locked in its alarm condition or in its running condition, the system is normally utilized with the element 160 in its unlocked position 171 with the key 169 disposed remotely from the mechanism 168. The element is then in its first position 175 under the urging of the second spring 178 except when manually actuated toward its second position 176. When utilized in this manner, the alarm system inhibits unauthorized use of a vehicle with the ignition key 43 when its key is left in the ignition switch 40 since the system assumes the alarm condition whenever the ignition terminal 41 is de-energized. When authorized use of the vehicle is desired, the element 160 is momentarily actuated manually into its second position, carrying the armature 136 into its running position 138. The ignition terminal is then energized in the usual manner with the ignition key to retain the armature in this position. The system is thus brought into its running condition without energizing the horn 71. The vehicle is then operated no differently from the manner in which it would be operated if not provided with the system. The system requires no attention when the ignition terminal is de-energized with the ignition key after authorized use since such de-energization automatically returns the system to its alarm condition as previously described. Such de-energization does not actuate the horn, although the alarm contacts 145 and 151 are closed, since the solenoid 117 of the auxiliary relay 112 is not energized from the then de-energized ignition terminal.

Under the conditions just described, since the system 10 is in its alarm condition, inadvertent leaving of the lighting switch 31 in a closed position results in the device 193 being energized as a signal that the lighting switch should be opened to prevent running down the battery 20. Since this signaling device is energized through the lighting switch, the signal is given even though the ignition terminal 41 is de-energized. The provision of this signal does not require the addition of elaborate electrical elements to the balance of the system, but only requires that the master relay 111 include the pair of contacts 147 and 153 to achieve the necessary switching action. The master relay could be economically provided with pairs of contacts motivated by the armature 136 in addition to those described herein to provide desired signaling or safety functions operational in the alarm position 137 of the armature 136. Such additional contacts could, of course, the either open or closed in the alarm position.

An advantageous manner of using the system 10 is available when the master key 169 and the ignition key 43 of a vehicle equipped with the system are not physically connected, as for example when these keys are attached to separate key rings. Preferably, the master key 169 of the present invention is kept with a conventional door key for the vehicle, not shown. The ignition key and the master key are utilized in starting the vehicle as previously described. At this time when attention is concentrated on the vehicle, the master key is removed from the master relay 111 and carried on the person with the door key. When the vehicle reaches a destination, the ignition key is utilized to de-energize the ignition system 45 in the conventional manner. Even if the ignition key is then inadvertently left in the ignition switch 40, the vehicle cannot be operated since the system assumes its alarm condition. An attempted theft of the vehicle with an ignition key inadvertently left therein will, therefore, result in sounding the horn 71 while the ignition system and the starting system 60 are disabled. If the element 160 is locked in its first position 175 when the master key is removed, unauthorized operation of the vehicle, even by those familiar with the operation of the system, is inhibited. If the ignition key is inadvertently locked in the vehicle, whether left in the ignition switch or not, the door key carried on the person is available to gain access to the vehicle in the usual manner. Use of the system of the present invention in this manner thus provides a convenient procedure minimizing the danger of vehicle theft due to an ignition key inadvertently left in the ignition switch and eliminating inconvenience due to locking the ignition key in the vehicle.

It is, therefore, apparent that the system 10 prevents unauthorized operation of an automotive vehicle by disabling its starting system 60 with the cut-out relay 100. This relay is energized from the terminal 72 of the horn 71 when unauthorized use of the vehicle is attempted with the armature 136 in its alarm position 137. With the element 160 in its unlocked position 171, the element is conveniently actuatable with the key 169 removed from the key-lock mechanism 168 to move the armature to its running position 138. However, the element 160 is lockable with this mechanism in the first position 175 to prevent operation of the vehicle or is lockable in the second position 176 to bypass the alarm system and allow the vehicle to be operated conventionally. The alarm and antitheft system, by the inclusion of the lighting contacts 147 and 153, is adapted to energize a signaling device when lights of the vehicle are energized and its ignition switch is in an "off" position. The system of the present invention is economically included in a vehicle when initially manufactured and, by use of the connections 105, 190, and 196 and connecting of the conductor 107 to the terminal 72 of the horn, is easily installed in an existing vehicle.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An alarm and antitheft system for an automotive vehicle equipped with a source of electrical energy, a starter motor, a solenoid which connects the motor to the source when the solenoid is electrically energized therefrom, a switch provided with a starting terminal and adapted selectively to energize the terminal from the source, an electrically energizable warning device, and a warning switch selectively actuatable to energize the warning device from the source, the alarm and antitheft system comprising:

A. first switching means having a control terminal and being electrically connected between the starting terminal and the solenoid for opening electrical connection between the starting terminal and the solenoid when the control terminal is energized and for closing such electrical connection when the control terminal is de-energized;

B. second switching means connected in parallel with the warning switch for providing an alarm condition wherein the warning switch is bypassed, energizing the warning device when the warning switch is not actuated, and for providing a running condition wherein the warning switch is not so bypassed; and C. a conductor electrically connecting the warning device and the control terminal so that in the alarm condition, the control terminal is energized from the warning device, opening electrical connection between the starting terminal and the solenoid so that the motor is not energized from the source when the starting terminal is energized therefrom.

2. The alarm and antitheft system of claim 1 wherein the vehicle is equipped with a switch providing an ignition terminal selectively energizable from the source and with an ignition system, and wherein the second switching means is connected in series between the ignition terminal and the ignition system for disconnecting the ignition system from the ignition terminal in the alarm condition and for connecting the ignition system to the ignition terminal in the running condition.

3. The alarm and antitheft system of claim 2 wherein the second switching means includes an input terminal connected to the ignition terminal and an element selectively manually actuatable between a first position and a second position, the second switching means being adapted to assume:
  A. the alarm condition when the input terminal is not energized and the element is in the first position;
  B. the running condition when the element is in the second position; and
  C. the running condition when the input terminal is energized and the element is subsequently actuated from the first position into the second position.

4. The alarm and antitheft system of claim 3 wherein the source has a live terminal and a ground terminal and the vehicle is further equipped with an electrically energizable light, a lighting switch having a terminal connected to the source and an opposite terminal, and a conductor connecting the light and the opposite terminal to energize the light from the source when the lighting switch is closed, and wherein:
  A. the second switching means includes a terminal which is connected to the ground terminal when the device is in the alarm condition and is disconnected therefrom when the device is in the running condition; and
  B. the alarm and antitheft system further comprises an electrically energizable signaling means connected between said conductor and said terminal so that the signaling means is energized when the lighting switch is closed and the second switching means is in the alarm condition.

5. The alarm and antitheft system of claim 2 wherein:
  A. the second switching means comprises a master relay and an auxiliary relay, the master relay having
    (1) a frame,
    (2) a fixed alarm contact mounted on the frame,
    (3) a fixed running contact mounted on the frame and electrically connected to the ignition terminal,
    (4) an input terminal mounted on the frame and electrically connected to the ignition terminal,
    (5) an armature mounted on the frame for movement between an alarm position and a running position defining, respectively, the alarm condition and the running condition of such switching means,
    (6) a member resiliently urging the armature toward the alarm position,
    (7) an electromagnetic element mounted on the frame and energized when the input terminal is energized to urge the armature electromagnetically toward the running position, the electromagnetic force exerted on the armature being relatively less than the resilient force exerted thereon in the alarm position and being relatively greater than the resilient force in the running position so that, when the input terminal is energized, the armature is stable in either position thereof in the absence of other forces and, when the input terminal is de-energized, the armature is resiliently urged into the alarm position,
    (8) a movable alarm contact motivated by the armature to contact the fixed alarm contact in the alarm position,
    (9) a movable running contact motivated by the armature to contact the fixed running contact in the running position, and
    (10) a selectively actuatable element mounted on the frame in juxtaposed relation to the armature for movement in a direction from the alarm position toward the running position and disposed so as to engage the armature when in the alarm condition and carry the armature into the running position as the element moves in said direction; and
  B. the alarm and antitheft system includes
    (1) a conductor connecting one of the alarm contacts to the input terminal,
    (2) a conductor connecting the other of the alarm contacts to the auxiliary relay,
    (3) a conductor connecting one of the running contacts to the input terminal, and
    (4) a conductor connecting the other of the running contacts to the ignition system.

6. The alarm and antitheft system of claim 5 wherein the master relay includes:
  A. a member resiliently urging the selectively actuatable member in a direction toward the alarm position; and
  B. a key-lock mechanism adapted to
    (1) lock said element in a first position disengaged from the armature and corresponding to the alarm position thereof,
    (2) lock said element in a second position in engagement with the armature and corresponding to the running position thereof, and
    (3) unlock said element for movement from the second position toward the first position under the urging of said resilient member and for manually motivated movement toward the second position in opposition to said resilient member.

7. The alarm and antitheft system of claim 5 wherein the source has a live terminal and a ground terminal and the vehicle is further equipped with an electrically energizable light; a lighting switch having a terminal connected to the source and an opposite terminal; and a conductor connecting the light and the opposite terminal to energize the light from the source when the lighting switch is closed, and wherein:
  A. the master relay has a fixed lighting contact mounted on the frame and a movable lighting contact motivated by the armature to contact the fixed lighting contact in the alarm position; and
  B. the alarm and antitheft system further comprises
    (1) a pair of lighting conductors individually electrically connecting the lighting contacts to the ground terminal and to the conductor connecting the light and said opposite terminal, and
(2) an electrically energizable signaling means connected in one of the lighting conductors for energization when the lighting switch is closed and the armature is in the alarm position.

8. The alarm and antitheft system of claim 5 wherein the auxiliary relay has:
   A. an electromagnetic element electrically connected to said conductor from the other of the alarm contacts so that the element is energized when the input terminal is energized and the armature is in the alarm condition; and
   B. a pair of contacts electrically connected in parallel with the warning switch and adapted to be closed when said electromagnetic element is energized, thereby energizing the warning device.

9. An alarm and antitheft system for an automotive vehicle equipped with a source of electrical energy having a live terminal and a ground terminal, an ignition system, a starting system, a switch having an ignition terminal and a starting terminal individually selectively energizable from the live terminal, an ignition conductor electrically connecting the ignition terminal and the ignition system, a starting conductor electrically connecting the starting system to the starting terminal, and a warning system including a normally open, momentary contact warning switch having a terminal selectively connected to the ground terminal when the warning switch is closed to actuate the warning system, a conductor connected to the warning switch terminal and a warning device having a terminal which is electrically energized from the live terminal when the warning switch is closed to provide a warning exteriorly of the vehicle, the alarm and antitheft system comprising:
   A. a cut-out relay having
      (1) a pair of normally closed contacts connected in series in the starting conductor, and
      (2) a solenoid electrically connected between the warning device terminal and the ground terminal and adapted electromagnetically to open the normally closed contacts when the warning device terminal is energized so that the starting system cannot be energized from the starting terminal;
   B. an auxiliary relay having
      (1) a pair of normally open contacts individually connected to the conductor of the warning system and to the ground terminal,
      (2) a control terminal, and
      (3) a solenoid electrically connected between the control terminal and the ground terminal, said solenoid being adapted when energized to electromagnetically close the normally open contacts and bypass the warning switch so as to energize the warning device terminal and the solenoid of the cut-out relay;
   C. a master relay having
      (1) a frame,
      (2) a solenoid mounted on the frame having a terminal electrically connected to the ground terminal and an opposite terminal,
      (3) an armature mounted on the frame for movement toward the solenoid into a running position juxtaposed thereto and from the solenoid into an alarm position spaced from the solenoid, the solenoid electromagnetically exerting a force urging the armature toward the running position when said opposite terminal thereof is electrically connected to the live terminal,
      (4) first resilient means exerting a force urging the armature toward the alarm position, the relative resilient and electromagnetic forces being such that, in the absence of other forces, the armature remains in a selected one of the positions when the solenoid is energized and assumes the alarm position when the solenoid is de-energized,
      (5) a pair of alarm contacts adapted to be closed by movement of the armature into the alarm position and opened by movement of the armature toward the running position,
      (6) a pair of running contacts adapted to be closed by movement of the armature into the running position and opened by movement of the armature toward the alarm position,
      (7) a conductor electrically connecting said opposite terminal, one of the alarm contacts, and one of the running contacts,
      (8) a manually actuatable element mounted on the frame for elective movement between a first position and a second position corresponding, respectively, to the alarm position and the running position, the element engaging the armature as the element moves toward the second position so as to carry the armature into the running position and being manually actuatable for movement from the first position toward the second position,
      (9) second resilient means urging the element toward the first position so that when the element is not actuated, the armature moves into the alarm position under the urging of the first resilient means when said solenoid is de-energized, and
      (10) Key actuated means selectively for locking the element in the first position, for locking the element in the second position, and for unlocking the element for movement between said positions when the key is remote from the master relay;
   D. a conductor electrically connecting the ignition terminal with said opposite terminal;
   E. a conductor electrically connecting the other of the running contacts to the ignition system so that the running contacts connect the ignition terminal to the ignition system in the running positions and disconnect the ignition terminal from the ignition system in the alarm position; and
   F. a conductor electrically connecting the other of the alarm contacts to the terminal of the auxiliary relay so that the alarm contacts electrically disconnect the auxiliary relay from the ignition terminal in the running position and electrically connect the terminal of the auxiliary relay to the input terminal in the alarm condition, whereby energization of the ignition terminal in the alarm condition energizes the solenoid of the auxiliary relay to energize the warning device and the solenoid of the cut-out relay and prevent energization of the starting system.

10. The alarm and antitheft system of claim 9 wherein the vehicle is also equipped with an electrically energizable light, a selectively actuatable lighting switch having a terminal connected to the live terminal and an opposite terminal energized therefrom when the lighting switch is closed, and a lighting conductor electrically connecting the opposite terminal to the light, and wherein:
A. the master relay has a pair of lighting contacts adapted to be closed by movement of the armature into the alarm position and opened by movement of the armature into the running position; and
B. the alarm and antitheft system further comprises
   (1) a conductor electrically connecting one of the lighting contacts to the ground terminal,
   (2) a signaling conductor electrically interconnected between the other of the lighting contacts and the lighting conductor, and
   (3) an electrically energizable signaling device electrically connected in the signaling conductor for energization thereby when the lighting switch is closed and the armature is in the alarm position.

* * * * *